United States Patent [19]
Kang et al.

[11] Patent Number: 6,063,851
[45] Date of Patent: May 16, 2000

[54] POLYOLEFIN RESIN COMPOSITION

[75] Inventors: Hae-Seung Kang; Byung-Jin Lee, both of Ulsan Kyungsangnam-do; Yun-Won Geon; Seung-Soo Lee, both of Iksan Geonlabuk-do, all of Rep. of Korea

[73] Assignee: Hyundai Motor Company, Ltd., Seoul, Rep. of Korea

[21] Appl. No.: 08/759,675

[22] Filed: Dec. 6, 1996

[30] Foreign Application Priority Data

Dec. 7, 1995 [KR] Rep. of Korea ................. 95-47485

[51] Int. Cl.$^7$ ................. C08J 5/10; C08K 3/34; C08L 23/12
[52] U.S. Cl. ................. 524/451; 524/425; 524/423; 524/449
[58] Field of Search ................. 524/451, 425, 524/423, 449

[56] References Cited

U.S. PATENT DOCUMENTS 5,324,771  6/1994  Suehiro et al. ................. 524/525

FOREIGN PATENT DOCUMENTS 54-43250  4/1979  Japan .
56-88447  7/1981  Japan .
7-145278  6/1995  Japan .

*Primary Examiner*—James J. Seidleck
*Assistant Examiner*—U. K. Rajguru
*Attorney, Agent, or Firm*—Birch, Stewart, Kolasch and Birch, LLP

[57] ABSTRACT

A polyolefin resin composition containing polypropylene, an inorganic filler, and hydrogenated styrene-butadiene rubber for providing a material with scratch resistance, impact strength, and inner scratch irrodition.

5 Claims, No Drawings

# POLYOLEFIN RESIN COMPOSITION

BACKGROUND OF THE INVENTION

1. Field of the Invention

The present invention relates to an improved polyolefin resin composition and more particularly, to a polyolefin resin composition comprising a polyolefin, e.g. polypropylene, an inorganic filler, and a hydrogenated styrene-butadiene rubber which possesses improved mechanical properties such as excellent scratch resistance, good surface strength, good heat resistance, and good impact strength. Advantageously, the composition can be used as a material for the crash pad of a vehicle.

2. Description of the Related Art

Various types of materials used as a crash pad for vehicles are well known in the art. Generally a crash pad for a vehicle comprises three basic types. A first type is composed of a basic substance, foam and a covering; a second type is composed of a basic substance and a part pad (foam plus covering), and a third type is composed of only the basic substance. In fact, various types of vehicles except luxurious vehicles use crash pads which constitute only the basic substance of the above three types. At the present time, the basic substance mainly includes acrylonitrile-butadiene-styrene copolymer and polycarbonate or polypropylene. Polypropylene material has been used because of its inexpensive cost. Accordingly, the use of propylene material is being investigated as an improvement in the art.

Recently, in order to follow the moving trend of using lightweight materials and cost reduction, improvements in plastic elements are actively being sought. One of the typical examples of such a resinous composition is one containing polypropylene. Such a resinous composition which contains an inorganic filler has the advantages of excellent heat resistance, good mechanical strength, and dimensional stability. However, it also possess disadvantages of low impact resistance and reduced scratch resistance so that such prior olefin resin compositions are not resistant to crease-whitening (inner scratch irrodition).

The above type olefin resin compositions are disclosed in Japanese Laid-Open Patent No. 54-43250 which relates to a composition comprising 0.1–100 wt % of an inorganic filler and a polyolefin; Japanese Laid-Open Patent No. 56-88447 which relates to an ethylene/propylene copolymer consisting of 90–98.5% by weight of polycrystalline propylene, 5–0.5 wt % noncrystalline ethylene/propylene copolymer containing 20–90 mol % ethylene unit, and 5–1 wt % crystalline ethylene homopolymer, and Japanese Laid-Open Patent No. 7-145278 which relates to a propylene polymer resin composition produced by incorporating 100 pts. by wt. of polypropylene with 1–10 pts. by wt. of hydrogenated SBR (styrene-butadiene rubber).

SUMMARY OF THE INVENTION

Accordingly, it is an object if the present invention to provide an improved polyolefin resin composition, which eliminates the above disadvantages encountered in the conventional polyolefin resin compositions.

Another object of the present invention is to provide a polyolefin resin composition comprising 40–90 wt % of a polypropylene-containing resin, 5–40 wt % of an inorganic filler, and 2–15 wt % of a hydrogenated styrene-butadiene rubber which possesses improved mechanical properties such as excellent scratch resistance, good surface strength, good heat resistance, and good impact strength which makes it particularly effective for use in the crash pad of a vehicle.

A further object of the present invention is to provide a polyolefin resin composition comprising a polypropylene-containing polymer, e.g. a propylene homopolymer or a propylene-ethylene block copolymer, an inorganic filler, e.g., talc, calcium carbonate, barium sulfate, mica, etc., and a hydrogenated styrene-butadiene rubber.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a polyolefin resin composition comprising a polypropylene containing polymer, an inorganic filler and a hydrogenated styrene-butadiene rubber in ratio of 40–90 to 5–40 and in an amount of 2–15% by weight. This composition is effective in improving scratch resistance, surface strength, heat resistance, and impact strength and thus can be used in a crash pad of a vehicle.

DETAILED DESCRIPTION OF PREFERRED EMBODIMENTS

Referring now in detail to the present invention, there is provided a polyolefin resin composition comprising about 40–90 wt % of a polypropylene-containing resin, about 5–40 wt % of an inorganic filler, and about 2–15 wt % of a hydrogenated styrene-butadiene rubber for effectively improving scratch resistance, surface strength, heat resistance, and impact strength. The present invention can be used in the crash pad of a vehicle and for other uses requiring such properties.

The polypropylene as the main ingredient of the polyolefin resin composition of the present invention can be a propylene homopolymer, a propylene-ethylene block copolymer, and the like. The propylene homopolymer and the propylene-ethylene block copolymer have a melt index (MI) of about 1–50 g/10 min., preferably an MI of about 4–35 g/10 min. If the MI of the homopolymer or block copolymer is less than 1 g/10 min., the molding ability is remarkably reduced due to bad fluidity. If the MI of the homopolymer or block copolymer is more than 50 g/10 min., the impact strength is remarkably reduced. Also, about 40–90 wt % of polypropylene is utilized, preferably about 55–80 wt %. If the amount of polypropylene or polypropylene-containing resin is less than 40 wt %, the essential characteristics of the composition is lost.

The inorganic filler is added to the polyolefin resin composition of the present invention so as to increase the mechanical strength of the composition. The inorganic filler of the present invention can include, for example, talc, calcium carbonate, mica, glass fibers, barium sulfate, wallastonite, silica, alumina, aluminum hydrate, titanium oxide, or a mixture thereof.

The inorganic filler is preferably talc, calcium carbonate, barium sulfate or mica. Also, the inorganic filler is present in an amount of about 5–40 wt %, based on the entire polyolefin resin composition of the present invention. The inorganic filler is present preferably in an amount of about 10–30 wt %. If the inorganic filler is less than 5 wt %, the polyolefin resin composition of the present invention possesses a low mechanical strength and if the inorganic filler is present in an amount over 40 wt %, the polyolefin resin composition has a reduced impact strength and an increased specific gravity.

The hydrogenated styrene-butadiene rubber improves the impact strength because the hydrogenated styrene-butadiene rubber has an excellent resistance to crease-whitening or inner scratch irrodition. If the hydrogenated styrene-butadiene rubber falls outside of the range of 2–15 wt %, the polyolefin resin composition of the present invention loses its impact strength and its inner scratch irrodition.

The polyolefin resin composition of the present invention may also include various types of additives such as, for example, anti-oxides, ultraviolet absorbents, electrification prevention materials, weather stabilizers, lubricants, and nucleus radiant.

The polyolefin resin composition can be manufactured by conventional manufacturing methods and apparatus. That is, the necessary ingredients are mixed, kneaded through a single or twin screw conveyor, and formed in a kind of pallet form. If required, the necessary ingredients can be mixed with additional ingredients to form a master batch which is subsequently converted into pallet form.

The present invention will be now described in more detail in connection with the following examples which should be considered as being exemplary of, but should not be considered as limiting, the present invention.

EXAMPLES 1–6 AND COMPARATIVE EXAMPLES 1–5

Following the ratios of Table I, polypropylene, hydrogenated styrene-butadiene rubber the inorganic filler and other impact strength agents, are mixed together to produce the polyolefin resin composition of the present invention. That is, in Example 1, 75 wt % of polypropylene, 5 wt % of hydrogenated styrene-butadiene rubber, an anti-oxide agent, and talc are placed into a Henshell mixer and the mixture is mixed for 5 minutes. Thereafter, 20 wt % of talc is added to the mixture and the mixture is formed as a pallet at a temperature of 210–228° C. by using a screw compressor. Thereafter, the pallet is formed according to ASTM procedures, comparing examples pieces using injection molding at a cylinder temperature of 210–230° C. and a mold with a temperature of 60° C.

The comparable example pieces produced by the above method is measured and their properties provided in Table I. In Table I, Notch Izod impact strength is observed at ASTM D256, curve resilient ratio at ASTM D790, heat transformed temperature at ASTM D648, Rockwell hardness at ASTM D785, resistant to the crease-whitening within eyeshot, and Rheometric Drop Weight Tester at normal test method.

TABLE 1

| Comp. | | Class | | | | | | | | | | |
|---|---|---|---|---|---|---|---|---|---|---|---|---|
| | | Examples of the Invention | | | | | | Comparative Examples | | | | |
| (wt%) | | 1 | 2 | 3 | 4 | 5 | 6 | 1 | 2 | 3 | 4 | 5 |
| PP | (1) | 75 | 75 | — | — | 65 | 65 | 75 | 75 | — | 65 | 65 |
| | (2) | — | — | 75 | 75 | — | — | — | — | 75 | — | — |
| SBR | (3) | 5 | — | 5 | — | 10 | — | — | — | — | — | — |
| | (4) | — | 5 | — | 5 | — | 10 | — | — | — | — | — |
| IR | (5) | — | — | — | — | — | — | 5 | — | 5 | 10 | — |
| | (6) | — | — | — | — | — | — | — | 5 | — | — | 10 |
| Talc | (7) | 20 | 20 | 20 | 20 | 25 | 25 | 20 | 20 | 20 | 25 | 25 |
| NIIRS (Kg · cm/cm) | | 17.4 | 18.3 | 13.1 | 14.5 | 27.8 | 32.0 | 11.0 | 13.2 | 3.8 | 18.9 | 19.1 |
| FM (kgf/cm) | | 32,500 | 32,000 | 35,000 | 35,000 | 28,500 | 27,000 | 28,500 | 29,000 | 31,000 | 26,500 | 27,000 |
| HTT (4.6 kgf, ° C.) | | 127 | 128 | 133 | 133 | 123 | 122 | 121 | 123 | 125 | 118 | 118 |
| R-Scale | | 94 | 93 | 97 | 96 | 92 | 92 | 88 | 90 | 92 | 85 | 87 |
| ISI | | ⊙ | ○ | ⊙ | ⊙ | ○ | ○ | Δ | Δ | ○ | x | Δ |
| RDT(Zn-16) | | 294 | 330 | 229 | 267 | 427 | 473 | 135 | 163 | 101 | 273 | 301 |

Wherein PP: polypropylene, SBR: Hydrogenated Styrene Butadiene rubber, IR: impact reinforcement, NIIRS: Notch Izod Impact Reinforcement; FM: flexural modulus; HTT: heat transform temperature; ISI: inner scratch irrodition; and
(1): Himont SB-912®, Himont Co.;
(2): Daelim H-181, Dae Lim Co.;
(3): JSR Dynaron 1320P@, JSR Co.;
(4): JSR Dynaron 1910P, JSR Co.;
(5): KEP 20P, Kumho Co.;
(6): Asahi Chemical H-1051, Asahi Chem. Co.; and
(7): Micro-Ace P3, Nippon Talc.

In the above table, ⊙ is considered excellent, ○ is good, Δ is normal, and x is poor.

As shown in the above Table I, a polyolefin resin composition which comprises 2–15 wt % of styrene-butadiene rubber and 5–40 wt % of inorganic filler added to 40–90 wt % of polypropylene possesses excellent impact strength and inner scratch irrodition when compared with the conventional resin compositions. Accordingly, the polyolefin resin composition of the present invention can be used as a crash pad material for a vehicle.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A polyolefin resin composition which consists of:
   (a) about 40–90 wt % of a polypropylene-containing resin,
   (b) about 5–40 wt % of an inorganic filler, and
   (c) about 2–15 wt % of a hydrogenated styrene-butadiene rubber.

2. The polyolefin resin composition of claim 1, wherein the polypropylene-containing resin is polypropylene or a propylene-ethylene block copolymer.

3. The polyolefin resin composition of claim 1, wherein the inorganic filler is selected from the group consisting of talc, calcium carbonate, barium sulfate, mica, and mixtures thereof.

4. A crash pad for a vehicle which possesses improved mechanical properties such as excellent scratch resistance, good surface strength, good heat resistance, and good impact strength comprising a polyolefin resin composition, which consists of:

(a) about 40–90 wt % of a polypropylene-containing resin, (b) about 5–40 wt % of an inorganic filler, and (c) about 2–15 wt % of a hydrogenated styrene-butadiene rubber.

5. The crash pad of claim 4, wherein the polypropylene-containing resin is polypropylene or a propylene-ethylene block copolymer.

* * * * *